United States Patent [19]
Lebby et al.

[11] Patent Number: 5,389,312
[45] Date of Patent: Feb. 14, 1995

[54] METHOD OF FABRICATING MOLDED OPTICAL WAVEGUIDES

[75] Inventors: Michael S. Lebby, Apache Junction; Davis H. Hartman, Phoenix, both of Ariz.

[73] Assignee: Motorola, Inc., Schaumburg, Ill.

[21] Appl. No.: 143,276

[22] Filed: Oct. 26, 1993

[51] Int. Cl.$^6$ .............................................. B29D 11/00
[52] U.S. Cl. ........................... 264/1.24; 264/2.7; 264/251; 264/267; 385/129
[58] Field of Search ............... 264/1.1, 1.5, 157, 250, 264/259, 267, 269, 313, 317, 251, 2.7; 385/124, 125, 129; 29/592.1, 825

[56] References Cited

U.S. PATENT DOCUMENTS

| | | | |
|---|---|---|---|
| 3,080,616 | 3/1963 | Imamura | 264/267 |
| 3,737,292 | 6/1973 | Keck et al. | |
| 3,848,040 | 11/1974 | Confer et al. | 264/317 |
| 4,039,607 | 8/1977 | Miller | 264/1.5 |
| 4,043,026 | 8/1977 | Weidhaas et al. | 264/1.5 |
| 4,474,425 | 10/1984 | Kaede | 385/129 |
| 4,479,910 | 10/1984 | Kurokawa et al. | 264/1.5 |
| 4,711,752 | 12/1987 | Deacon et al. | 264/1.5 |
| 4,873,030 | 10/1989 | Taketani et al. | 264/1.5 |
| 5,265,184 | 11/1993 | Lebby et al. | 264/1.5 |

Primary Examiner—Mathieu D. Vargot
Attorney, Agent, or Firm—Eugene A. Parsons

[57] ABSTRACT

A method of manufacturing optical waveguides including providing a plurality of longitudinally extending, cylindrical passage-forming members positioned in parallel, spaced apart relationship. Molding a cladding member having opposed surfaces around the passage-forming members so that the passage-forming members extend through the cladding member and each of the opposed surfaces. Removing the passage-forming members from the molded cladding member subsequent to the molding step so as to leave a plurality of passages through the cladding member from one opposed surface to the other and positioning waveguide core material in the passages to form a plurality of optical waveguides.

15 Claims, 3 Drawing Sheets

METHOD OF FABRICATING MOLDED OPTICAL WAVEGUIDES

FIELD OF THE INVENTION

This invention relates, in general, to molded optical waveguides and, more particularly, to a simplified method of fabricating molded optical waveguides.

BACKGROUND OF THE INVENTION

At the present time, fabrication of optical waveguides is achieved by either a polymer spin-on technique or a diffusion technique, both of which require expensive photolithography steps. Additionally, both fabrication techniques are ineffective and inefficient for fabricating optical waveguides in high volumes for several reasons, such as complex processing steps, difficulties in controlling the processing steps, and high cost.

Briefly, as practiced by one method in the prior art, a polymeric film is spun onto a substrate. Portions of the polymeric film are subsequently exposed to light by a photolithographic process, thereby changing the refractive index of the polymeric film and creating a waveguide in the polymeric film. However, subsequent multi-step processing, such as removal of the polymeric film from the substrate, lamination processing, curing, and other processes typically are required for the waveguide to be useful. Further, it should be noted that each additional processing step incurs an additional cost, as well as presenting an opportunity to induce defects into the waveguide.

Alternatively, in another method practiced in the prior art, a layer such as a glass is applied to a substrate. The layer is patterned by a complicated photolithography process, thereby producing portions that are masked and portions that are open or clear. Typically, ions are subsequently diffused into the open portions of the layer, thus changing the refractive index of the layer and making a waveguide. However, by using a photolithography process, a high cost is incurred into manufacturing of the waveguide. Also, by using diffusion processes to change the refractive index of the layer, control of dimensionality of the waveguide is severely limited.

Additionally, while making grooves in a plastic material and subsequently filling of these grooves with material for conducting light has been done in the past, these methods are only adequate for large mechanical orientated optical systems. Further, these methods characteristically are inefficient at conducting light, thus making them unsuitable for use in high speed communications.

It can be readily seen that conventional methods for making waveguides have severe limitations. Also, it is evident that the conventional processing uses a multitude of steps which are not only complex and expensive, but also not effective processing. Therefore, a method for making a waveguide that provides a reduction in the number of steps required, reduces cost, and simplifies the processes necessary for making a waveguide would be highly desirable.

It is a purpose of the present invention to provide a new and improved method of fabricating an optical waveguide.

It is another purpose of the present invention to provide a new and improved method of fabricating an optical waveguide which requires fewer and simpler fabrication steps.

It is still another purpose of the present invention to provide a new and improved method of fabricating an optical waveguide which is adaptable to high quantity and low cost fabrication.

SUMMARY OF THE INVENTION

The above problems and others are at least partially solved and the above purposes and others are realized in a method of manufacturing optical waveguides including providing a plurality of longitudinally extending, cylindrical passage-forming members positioned in parallel, spaced apart relationship, molding a cladding member having opposed surfaces around the plurality of cylindrical passage-forming members so that the cylindrical passage-forming members extend through the cladding member and each of the opposed surfaces, removing the plurality of cylindrical passage-forming members from the molded cladding member subsequent to the molding step so as to leave a plurality of passages through the cladding member from one opposed surface to the other, and positioning waveguide core material in the passages to form a plurality of optical waveguides.

In the step of providing a plurality of longitudinally extending, cylindrical passage-forming members, the method optionally includes providing cylindrical passage-forming members each with an axially outwardly tapered portion positioned so as to form an adiabatic taper in each of the passageways adjacent one of the opposed surfaces of the molded cladding member.

The method further optionally includes a step of providing a plurality of longitudinally extending, cylindrical alignment guide-forming members positioned in parallel, spaced apart relationship with each other and with the plurality of cylindrical passage-forming members, the plurality of cylindrical alignment guide-forming members forming a plurality of alignment guide passages into the cladding member from at least one of the opposed surfaces.

BRIEF DESCRIPTION OF THE DRAWINGS

Referring to the drawings.

DESCRIPTION OF THE PREFERRED EMBODIMENTS

Figure 1:
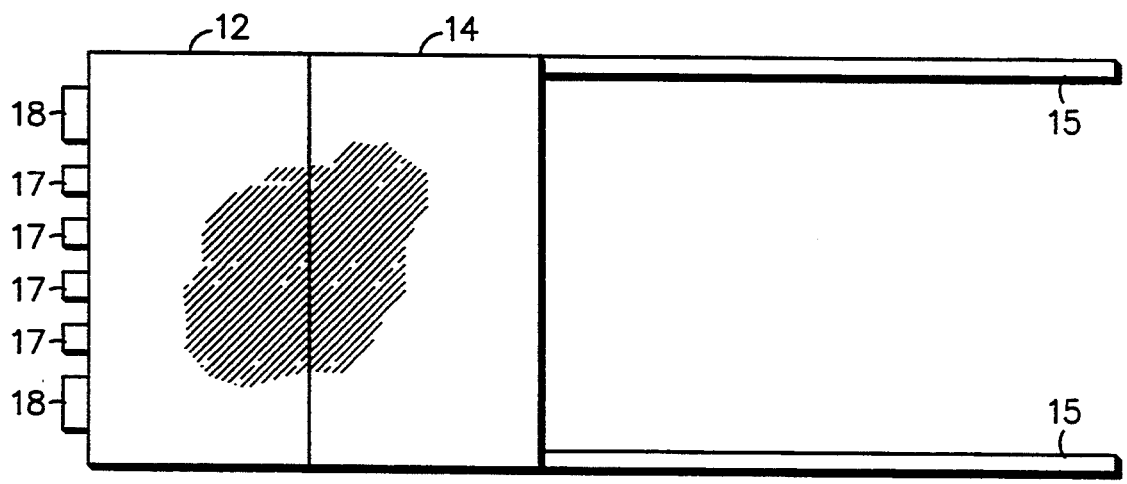
FIG. 1 is a view in top plan of a mold utilized in the present novel method.
Figure 2:
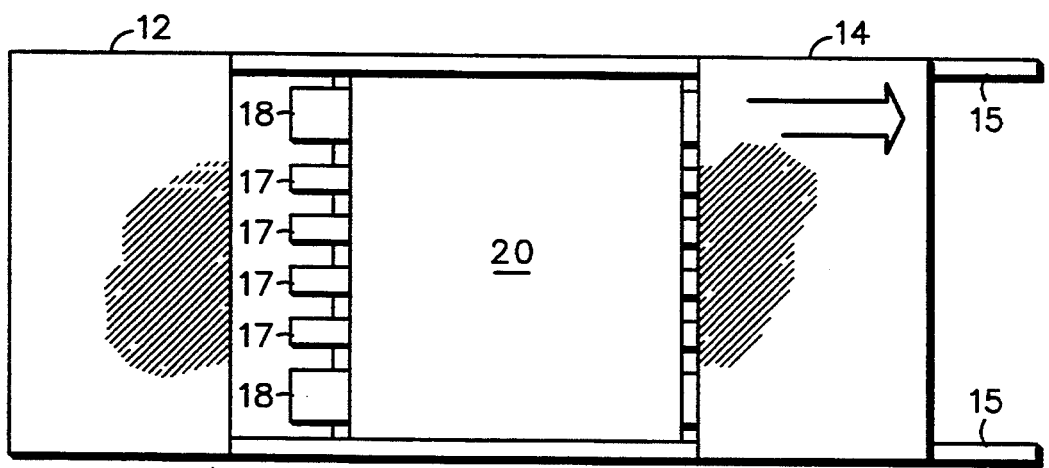
FIG. 2 is a view in top plan of the mold of FIG. 1 in a partially opened position.

Referring specifically to FIGS. 1 and 2, a mold 10 is illustrated which is utilized in the present novel optical waveguide fabrication method. Mold 10 may be, for example, an injection type mold, a transfer type mold, or any other convenient mold type. Mold 10 includes a first portion 12 and a second portion 14 formed to matingly define a mold cavity therebetween. Portion 12 is fixed and includes a pair of elongated tracks or rails 15 which extend outwardly therefrom and slideably mount portion 14. Portion 14 has a plurality of longitudinally extending, cylindrical passage-forming members 17 fixedly attached thereto in parallel, spaced apart relationship. In this specific embodiment a plurality of longitudinally extending, cylindrical alignment guide-forming members 18 are also fixedly attached to portion 14 in parallel, spaced apart relationship with each other and with the plurality of cylindrical passage-forming members 17. Passage-forming members 17 and alignment guide-forming members 18 extend substantially parallel with tracks 15 and are slideably engaged in openings (not shown) through portion 12 in the closed position.

With mold 10 in the closed position, passage-forming members 17 and alignment guide-forming members 18 extend completely through the mold cavity defined between portions 12 and 14. By way of example only, a cladding member 20 (see FIG. 2) is made by injecting a transparent epoxy molding compound, available under the Tradename HYSOL MG18 from Dexter Corporation, into mold 10. Temperature of mold 10 range between 150° C. to 175° C. with a preferred temperature range from 160 degrees Celsius to 165 degrees Celsius. Molding pressure of mold 10 ranges between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to to 4 minutes at a temperature of 175° C.

Upon completion of the curing time, cladding member 20 is removed from mold 10 by sliding portion 14 along tracks 15 into an open position. A partially open position is illustrated in FIG. 2, wherein portion 14 has moved from the closed position at the far left of tracks 15 (see FIG. 1) toward a position at the far right of tracks 15. As portion 14 slides toward the open position, passage-forming members 17 and alignment guide-forming members 18 are disengaged from portion 12 and begin to slide within the passages formed in cladding member 20. When portion 14 reaches the full open position (not shown) passage-forming members 17 and alignment guide-forming members 18 are completely disengaged from cladding member 20 and cladding member 20 drops free of mold 10. Typically, a post-curing step is necessary in order to achieve maximum physical and electrical properties of the HYSOL material. This step generally proceeds at 150 degrees Celsius for approximately 2 to 4 hours. Completion of the post-cure step results in cladding member 20 having a refractive index of approximately 1.52. While a specific material is utilized for this example, it will be understood by those skilled in the art that many other materials can be utilized and different materials may be utilized for different types of molding processes. Additional examples of molding materials are given in copending application entitled "Molded Waveguide and Method for Making Same", Ser. No. 07/889,335, filed May 28, 1992, now U.S. Pat. No. 5,265,184, issued Nov. 23, 1993 and incorporated herein by reference.

Figure 3:
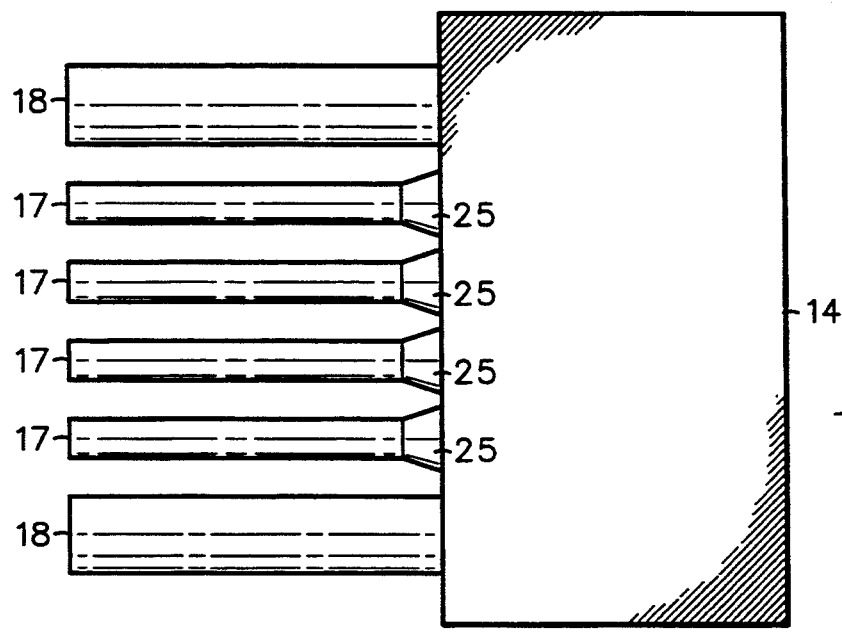
FIG. 3 is an enlarged view in top plan of a portion of the mold of FIG. 1.

An enlarged view of portion 14 of mold 10 is illustrated in FIG. 3. Cylindrical passage-forming members 17 and alignment guide-forming members 18 are illustrated as circular in this specific embodiment but it will be understood by those skilled in the art that virtually any geometric cylindrical cross-section which is convenient for the intended purpose can be utilized. In this view it can be seen that cylindrical passage-forming members 17 each include an axially outwardly tapered portion 25 positioned so as to form an adiabatic taper in each of the passageways adjacent one opposed surface of molded cladding member 20. It should be understood that, while the adiabatic taper at an end of the passageways has many advantages, it is optional and may not be required in all cladding members 20. Further, while mold 10 is constructed so that an adiabatic taper can only be formed at one end of the passageways through cladding member 20, it should be understood that a mold could be utilized with cylindrical passage-forming members having approximately one-half each fixedly attached to portions 12 and 14 so as to slideably mate at the center of the mold cavity. Thus, each half of the cylindrical passage-forming members would be withdrawn from the cladding member in opposite directions and an axially outwardly tapered portion could be positioned so as to form an adiabatic taper at each end of the passageways through the molded cladding member.

Figure 4:
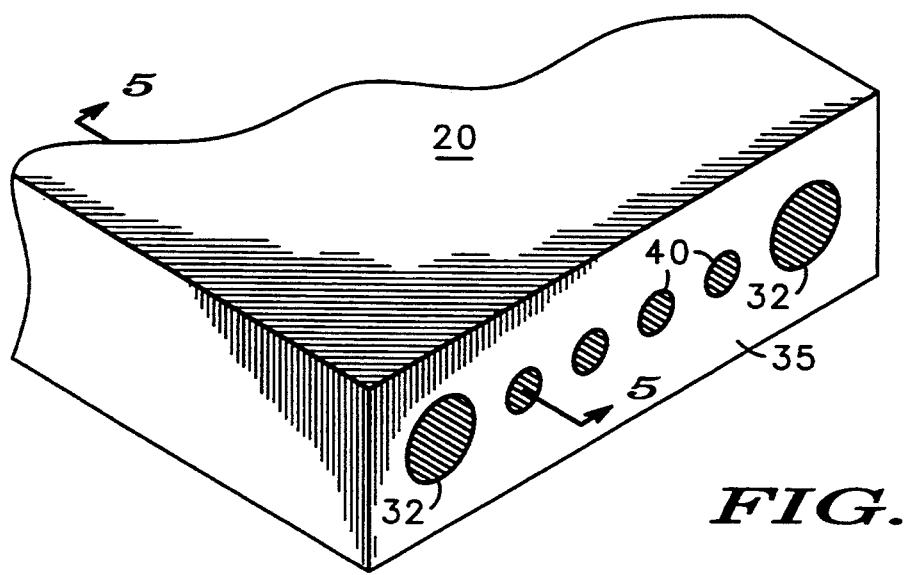
FIG. 4 is an enlarged perspective view of an optical waveguide fabricated in accordance with the present novel method.
Figure 5:
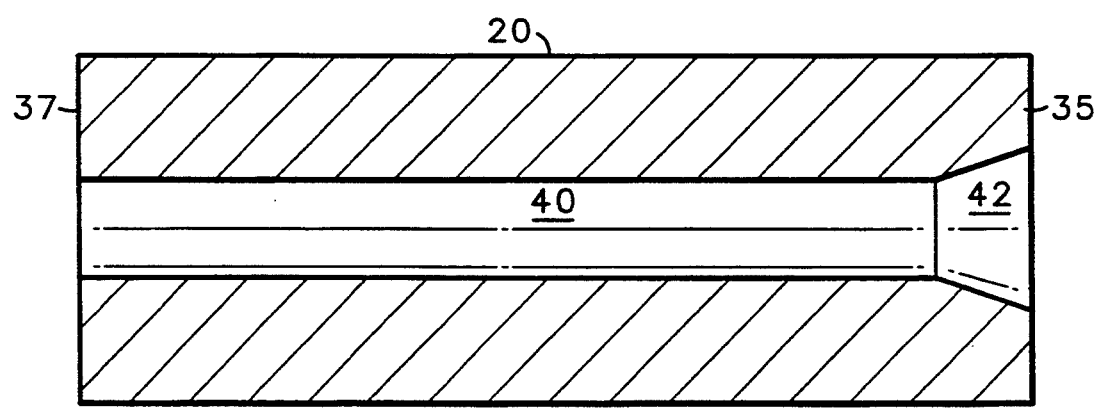
FIG. 5 is an enlarged cross-sectional view as seen from the line 5—5 of FIG. 4.

Referring specifically to FIG. 4, a perspective view of an optical waveguide 30 formed in accordance with the present method is illustrated, portions thereof broken away. A cross-sectional view of waveguide 30, as seen from the line 5—5 of FIG. 4, is illustrated in FIG. 5. Optical waveguide 30 includes cladding member 20 having alignment passages 32 extending from a front face 35 therethrough to a rear face 37. In some applications it may be desirable to have alignment passages 32 extend only partially through cladding member 20, in which case alignment guide-forming members 18 will only extend the required distance into the mold cavity.

Optical waveguide 30 further includes a plurality of passages 40 which extend from front face 35 of cladding member 20 to rear face 37. Each of passages 40 has an adiabatically tapered end 42 adjacent front face 35. By adiabatically tapering the inlet (and/or outlet) of each of passages 40, a large number of advantages are realized. For example, mating the inlet to another component, such as an optical fiber, is simplified because the larger diameter of the inlet at surface 35 greatly reduces alignment problems and tolerances. The adiabatic taper is designed so that substantially any light introduced into the end of passage 40 at surface 35 is guided into the smaller (none tapered) portion of passage 40.

Typically, passages 40 of molded cladding member 20 are filled with an optically transparent material which forms a plurality of optical cores in optical waveguide 30. The optically transparent material generally may be any of several materials, such as epoxies, plastics, polyimides, or the like. Generally, refractive indexes of these optically transparent materials range from 1.48 to 1.58. It should be understood that to form an optical waveguide the refractive index of the cores should be at least 0.01 greater than the refractive index of cladding member 20. Generally, the optically transparent material is in a liquid form and passages 40 are filled by dipping the front face 35 into the liquid and allowing passages 40 to fill by capillary action. In this process the adiabatically tapered ends of passages 40 enhances the capillary action and aids to quickly and easily fill passages 40 with the liquid transparent material. In this specific embodiment the liquid transparent material is an optically clear epoxy available under a Tradename EPO-TEK 301-2 from EPOXY TECHNOLOGY INC. After the adhesive is applied to fill passages 40 of cladding member 20, cladding member 20 with filled passages 40 is cycled through a curing process. Curing times for the optically clear epoxy is dependent upon temperature, e.g., at room temperature curing time is 2 days and at 80 degrees Celsius curing time is 1.5 hours.

Figure 6:
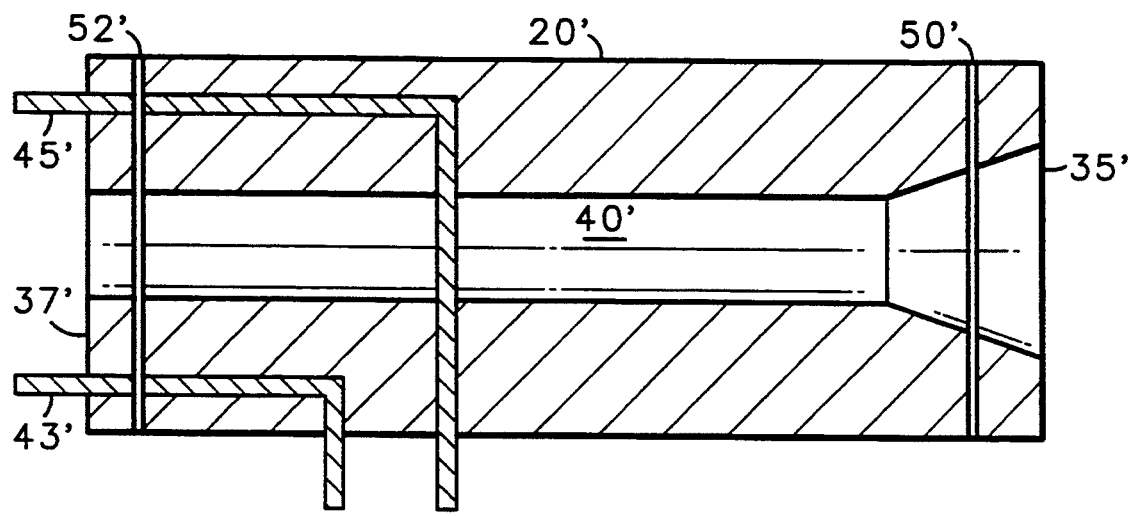
FIG. 6 is a view similar to FIG. 5 of another embodiment.

Referring to FIG. 6, a cross-sectional view of another embodiment of an optical waveguide 30' is illustrated. In this embodiment, a cladding layer 20' having front and rear faces 35' and 37' respectively, and a plurality of passages 40' extending therebetween is substantially similar to optical waveguide 30 of FIG. 5 and formed by a similar method. In optical waveguide 30', a plurality of electrical leads 43' and 45' are molded into cladding member 20' during the molding process. Electrical leads 43' could be, for example, a sheet of electrically conducting material which forms a ground plane for all of the plurality of passages 40'. Electrical leads 45 could be, for example, a lead frame including a lead associated with each passage 40. Additional information on various leads and the incorporation thereof into a cladding member is provided in a copending application entitled "MOLDED OPTICAL WAVEGUIDE WITH CONTACTS UTILIZING LEAD FRAMES AND METHOD OF MAKING SAME" Ser. No. 07/920,073, filed Jul. 27, 1992, now U.S. Pat. No. 5,271,083, issued Dec. 14, 1993 and incorporated herein by reference.

Once passages 40' of cladding member 20' are filled and cured, the ends can be sawed at 50' and 52' to provide smoothly polished ends. Cut at 50' is made to provide the desired amount of adiabatic taper. It should be understood that in some applications no adiabatic taper will be desired and in these specific applications cut 50' will be performed at the beginning of the adiabatic taper so as to provide passages 40' with no taper at the end thereof. Cut 52' is generally made to provide a predetermined length for optical waveguide 30'. Cut 52' also removes the ends of electrical leads 43' and 45' so as to leave electrical contacts in the rear face of optical waveguide 30'. The electrical contacts in the rear face are positioned so that photonics devices, such as photodetectors or light generating devices, can be easily affixed, by soldering, bump bonding, etc., directly to optical waveguide 30' and the working portions thereof will be automatically aligned with passages 30'.

Figure 7:
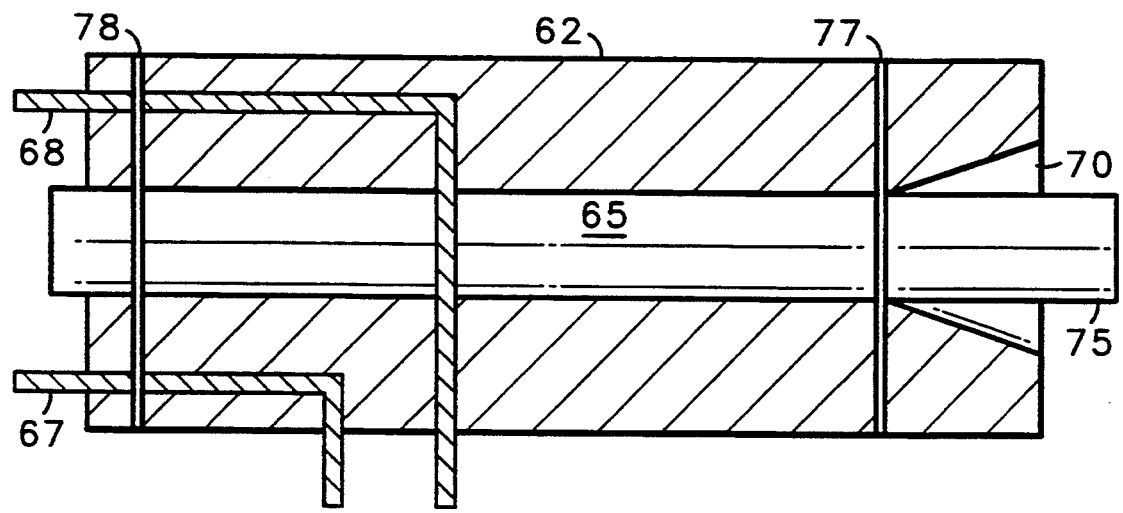
FIG. 7 is a view similar to FIG. 5 of another embodiment.

Referring specifically to FIG. 7, another embodiment of an optical waveguide 60 is illustrated. Optical waveguide 60 includes a cladding member 62 which is substantially similar to cladding member 20 and fabricated utilizing similar steps. Cladding member 62 includes a plurality of passages 65 extending therethrough and electrical leads 67 and 68 molded therein. Passages 65 have an adiabatic taper 70 formed at one end, as previously described in conjunction with FIG. 5. In this specific embodiment, instead of filling passages 65 with a liquid plastic and curing the plastic to form a core, an optical fiber 75 (glass or plastic) is inserted into each passage 65, utilizing adiabatic taper 70 to simplify the insertion step. Optical waveguide 60 is cut at 77 to completely remove the now unfilled adiabatic taper 70 and to provide a smooth front face. A second cut is made at 78 to provide a smooth rear surface (and the correct length) with electrical contacts therein for the mounting of photonic devices. It may be necessary, at least in some applications, to wet optical fibers 75 with a liquid adhesive, prior to insertion into passages 65 to prevent any subsequent movement. This particular embodiment does not require the filling and curing steps described in conjunction with the embodiment illustrated in FIG. 5 and may be somewhat simpler, in some applications.

Thus, a new and improved method of fabricating optical waveguides is disclosed which has the advantage of fewer process steps and, therefore, is cheaper and easier than prior methods. Further, the present novel method provides a higher machine throughput and, therefore, is more manufacturable. Because only one cladding member is molded and utilized, assembly steps are reduced. In this process adiabatic tapering of one or both ends of the optical waveguide cores is easily incorporated. Also, by incorporating the adiabatic tapering, alignment tolerances during assembly are substantially reduced and manufacturing is simplified (i.e., filling the passages with liquid core material or optical fibers). Further, cylindrical passage-forming members 17 generally have a relatively thin cross-section (in the range of 5 microns to as large as 5 millimeters) so that tapered ends 25 aids in strengthening cylindrical passage-forming members 17.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of manufacturing optical waveguides comprising the steps of:
    providing a plurality of longitudinally extending, cylindrical passage-forming members positioned in parallel, spaced apart relationship;
    molding a cladding member having opposed surfaces around the plurality of cylindrical passage-forming members so that the cylindrical passage-forming members extend through the cladding member and each of the opposed surfaces;
    removing the plurality of cylindrical passage-forming members from the molded cladding member subsequent to the molding step so as to leave a plurality of passages through the cladding member from one opposed surface to the other; and
    positioning waveguide core material in the passages to form a plurality of optical waveguides.

2. A method of manufacturing optical waveguides as claimed in claim 1 wherein the step of positioning waveguide core material in the passages includes positioning core material having an index of refraction in the range of approximately 1.48 to 1.58.

3. A method of manufacturing optical waveguides as claimed in claim 2 wherein the step of molding a cladding member includes molding the cladding member using cladding material having an index of refraction at least 0.01 less than the index of refraction of the core material.

4. A method of manufacturing optical waveguides as claimed in claim 1 wherein the step of positioning waveguide core material in the passages includes positioning an optical fiber in each of the plurality of passages.

5. A method of manufacturing optical waveguides as claimed in claim 1 wherein the step of positioning waveguide core material in the passages includes introducing curable liquid plastic into the passages to fill the passages and curing the liquid plastic in the filled passages.

6. A method of manufacturing optical waveguides as claimed in claim 5 wherein the step of introducing curable liquid plastic includes utilizing capillary action to fill the passages.

7. A method of manufacturing optical waveguides as claimed in claim 1 including in addition a step of cutting the molded cladding member parallel to the opposed surfaces to provide optical waveguides of a desired length.

8. A method of manufacturing optical waveguides as claimed in claim 1 including in addition a step of positioning electrical leads adjacent to the cylindrical passage-forming members prior to the molding step to form electrical contacts in the optical waveguide.

9. A method of manufacturing optical waveguides as claimed in claim 1 wherein the step of providing a plurality of longitudinally extending, cylindrical passage-forming members includes providing cylindrical passage-forming members each with an axially outwardly tapered portion positioned so as to form an adiabatic taper in each of the passageways adjacent one of the opposed surfaces of the molded cladding member.

10. A method of manufacturing optical waveguides as claimed in claim 1 including in addition a step of providing a plurality of longitudinally extending, cylindrical alignment guide-forming members positioned in parallel, spaced apart relationship with each other and with the plurality of cylindrical passage-forming members, the plurality of cylindrical alignment guide-forming members forming a plurality of alignment guide passages into the cladding member from at least one of the opposed surfaces.

11. A method of manufacturing optical waveguides as claimed in claim 1 wherein the plurality of cylindrical passage-forming members each have opposite ends and the method further includes the steps of supporting each of the plurality of cylindrical passage-forming members at each of the opposite ends and moving the plurality of cylindrical passage-forming members axially, relative to the molded cladding member, subsequent to the step of molding the cladding member and prior to the step of removing the plurality of cylindrical passage-forming members from the molded cladding member to loosen the molded cladding member from the plurality of cylindrical passage-forming members.

12. A method of manufacturing optical waveguides comprising the steps of:
providing a plurality of longitudinally extending, cylindrical passage-forming members positioned in parallel, spaced apart relationship;
molding a cladding member having opposed surfaces around the plurality of cylindrical passage-forming members so that the cylindrical passage-forming members extend through the cladding member and each of the opposed surfaces;
removing the plurality of cylindrical passage-forming members from the molded cladding member subsequent to the molding step so as to leave a plurality of passages through the cladding member from one opposed surface to the other;
positioning waveguide core material in the passages to form a plurality of optical waveguides, the core material in the passages including positioning core material having an index of refraction in the range of approximately 1.48 to 1.58; and
the step of molding the cladding member including molding the cladding member using cladding material having an index of refraction at least 0.01 less than the index of refraction of the core material.

13. A method of manufacturing optical waveguides as claimed in claim 12 wherein the step of providing a plurality of longitudinally extending, cylindrical passage-forming members includes providing cylindrical passage-forming members each with an axially outwardly tapered portion positioned so as to form an adiabatic taper in each of the passageways adjacent one of the opposed surfaces of the molded cladding member.

14. A method of manufacturing optical waveguides as claimed in claim 12 including in addition a step of providing a plurality of longitudinally extending, cylindrical alignment guide-forming members positioned in parallel, spaced apart relationship with each other and with the plurality of cylindrical passage-forming members, the plurality of cylindrical alignment guide-forming members forming a plurality of alignment guide passages into the cladding member from at least one of the opposed surfaces.

15. A method of manufacturing optical waveguides comprising the steps of:
providing a plurality of longitudinally extending, cylindrical passage-forming members positioned in parallel, spaced apart relationship, the cylindrical passage-forming members each including an axially outwardly tapered portion;
providing a plurality of longitudinally extending, cylindrical alignment guide-forming members positioned in parallel, spaced apart relationship with each other and with the plurality of cylindrical passage-forming members;
molding a cladding member having opposed surfaces around the plurality of cylindrical passage-forming members and the plurality of cylindrical alignment guide-forming members so that the cylindrical passage-forming members extend through the cladding member and each of the opposed surfaces and the plurality of cylindrical alignment guide-forming members extend into the cladding member from at least one of the opposed surfaces;
removing the plurality of cylindrical passage-forming members and the plurality of cylindrical alignment guide-forming members from the molded cladding member subsequent to the molding step so as to leave a plurality of passages through the cladding member from one opposed surface to the other, the axially outwardly tapered portion of the passage-forming members being positioned so as to form an adiabatic taper in each passageway adjacent one of the opposed surfaces of the molded cladding member, and the plurality of cylindrical alignment guide-forming members forming a plurality of alignment guide passages into the cladding member from at least one of the opposed surfaces;
positioning waveguide core material in the passages to form a plurality of optical waveguides, the core material in the passages including positioning core material having an index of refraction in the range of approximately 1.48 to 1.58; and
the step of molding the cladding member including molding the cladding member using cladding material having an index of refraction at least 0.01 less than the index of refraction of the core material.

* * * * *